(12) United States Patent
Yamanashi et al.

(10) Patent No.: US 10,292,481 B2
(45) Date of Patent: May 21, 2019

(54) MAKEUP APPLICATION ASSISTANCE DEVICE, MAKEUP APPLICATION ASSISTANCE METHOD, AND MAKEUP APPLICATION ASSISTANCE PROGRAM

(71) Applicant: PANASONIC INTELLECTUAL PROPERTY MANAGEMENT CO., LTD., Osaka (JP)

(72) Inventors: Tomofumi Yamanashi, Kanagawa (JP); Rieko Asai, Osaka (JP); Aoi Muta, Osaka (JP); Chie Nishi, Kanagawa (JP); Kaori Ajiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 187 days.

(21) Appl. No.: 15/010,215

(22) Filed: Jan. 29, 2016

(65) Prior Publication Data

US 2016/0157587 A1 Jun. 9, 2016

Related U.S. Application Data

(63) Continuation of application No. 14/387,696, filed as application No. PCT/JP2014/000308 on Jan. 22, 2014.

(30) Foreign Application Priority Data

Feb. 1, 2013 (JP) .................................. 2013-018276

(51) Int. Cl.
*A45D 44/00* (2006.01)
*G06Q 50/10* (2012.01)
(Continued)

(52) U.S. Cl.
CPC ........... *A45D 44/005* (2013.01); *A45D 44/00* (2013.01); *G06K 9/00261* (2013.01);
(Continued)

(58) Field of Classification Search
CPC .. A45D 44/005; A45D 44/00; G06K 9/00261; G06K 9/6215; G06Q 50/10;
(Continued)

(56) References Cited

U.S. PATENT DOCUMENTS

| 8,351,711 B2 | 1/2013 | Takano et al. |
| 2004/0110113 A1* | 6/2004 | Huang .................. G09B 19/00 |
| | | 434/100 |

(Continued)

FOREIGN PATENT DOCUMENTS

| CN | 101341507 | 1/2009 |
| CN | 101925345 | 12/2010 |

(Continued)

OTHER PUBLICATIONS

International Search Report from PCT/JP2014/000308, dated Feb. 18, 2014.

(Continued)

*Primary Examiner* — Robert P Bullington
(74) *Attorney, Agent, or Firm* — Greenblum & Bernstein, P.L.C.

(57) ABSTRACT

A makeup assisting apparatus includes an image acquirer that acquires a captured image of a face to which makeup is applied and that maps, when the captured image of the face is captured from an oblique direction, the captured image of the face to a stereoscopic shape of a face to generate an image of the captured image of the face seen from the front. An applied makeup acquirer acquires applied makeup from the image, the applied makeup being a way of applying the makeup. A makeup evaluators evaluates the applied makeup (Continued)

by comparing the applied makeup with a reference makeup, which is makeup to be used as a reference by a user having applied the makeup to the face and an evaluation presenter presents a result of the evaluation to the user.

16 Claims, 12 Drawing Sheets

(51) Int. Cl.
    *G06T 7/00* (2017.01)
    *G06T 11/00* (2006.01)
    *G06K 9/00* (2006.01)
    *G06K 9/62* (2006.01)
    *G09B 5/02* (2006.01)
    *G09B 19/00* (2006.01)
    *G06T 15/20* (2011.01)

(52) U.S. Cl.
    CPC ........... *G06K 9/6215* (2013.01); *G06Q 50/10* (2013.01); *G06T 7/0002* (2013.01); *G06T 11/00* (2013.01); *G06T 15/205* (2013.01); *G09B 5/02* (2013.01); *G09B 19/00* (2013.01); *G06T 2207/10024* (2013.01); *G06T 2207/30201* (2013.01)

(58) Field of Classification Search
    CPC ..... G06T 7/0002; G06T 11/00; G06T 15/205; G06T 2207/10024; G06T 2207/30201; G09B 5/02; G09B 19/00
    USPC ........................................................ 434/100
    See application file for complete search history.

(56) References Cited

U.S. PATENT DOCUMENTS

| | | |
|---|---|---|
| 2006/0055705 A1 | 3/2006 | Giron et al. |
| 2006/0178904 A1* | 8/2006 | Aghassian ........... A45D 44/005 705/1.1 |
| 2007/0172155 A1 | 7/2007 | Guckenberger |
| 2010/0220933 A1 | 9/2010 | Takano et al. |
| 2010/0288295 A1 | 11/2010 | Kamada et al. |
| 2012/0223956 A1* | 9/2012 | Saito ................... A45D 44/005 345/582 |
| 2015/0049111 A1 | 2/2015 | Yamanashi et al. |
| 2015/0086945 A1 | 3/2015 | Yamanashi et al. |
| 2015/0118655 A1 | 4/2015 | Yamanashi et al. |

FOREIGN PATENT DOCUMENTS

| | | |
|---|---|---|
| JP | 2001-216386 | 8/2001 |
| JP | 2001-346627 | 12/2001 |
| JP | 2002-224049 | 8/2002 |
| JP | 2002-324126 | 11/2002 |
| JP | 2003-044837 | 2/2003 |
| JP | 2007-175384 | 7/2007 |
| JP | 2007-257165 | 10/2007 |
| JP | 2008-257381 | 10/2008 |
| JP | 2010-017360 | 1/2010 |
| JP | 2010-073008 | 4/2010 |
| JP | 4809056 | 11/2011 |
| JP | 2012-128597 | 7/2012 |
| JP | 2012-152389 | 8/2012 |
| WO | 2008/102440 | 8/2008 |

OTHER PUBLICATIONS

European Search Report in European Patent Application No. 14745572.9, dated Sep. 15, 2015.
Search Report issued in China Patent Application No. 201480000923.5, dated Feb. 26, 2016 (English Translation).
U.S. Official Action issued in U.S. Appl. No. 15/010,213, dated Apr. 2, 2018.
U.S. Official Action issued in U.S. Appl. No. 15/010,213, dated Aug. 6, 2018.

* cited by examiner

510

| | 511 | 512 | 513 | 514 | 515 | 516 |
|---|---|---|---|---|---|---|
| | MAKEUP ID | MAKEUP TYPE | COLOR | CONCENTRATION | RANGE | COSMETICS ID |
| | FM1 | T1 | C1 | D1 | A1 | I1 |
| | FM1 | T2 | C2 | D2 | A2 | I2 |
| | FM1 | T3 | C3 | D3 | A3 | I3 |
| | FM1 | T4 | C3 | D2 | A4 | I4 |

| 521 | 522 | 523 |
|---|---|---|
| COSMETICS ID | COMPANY ID | ITEM NUMBER |
| I 1 | B 1 | b 1 1 |
| I 2 | B 1 | b 2 3 |
| ⋮ | ⋮ | ⋮ |

| 531 | 532 | 533 |
| --- | --- | --- |
| FACIAL PART ID | AREA | MAKEUP TYPE |
| P 1 | R 1 | T 1 |
| P 2 | R 2 | T 2 |
| ⋮ | ⋮ | ⋮ |

| FACIAL PART ID | AREA | PERSON ID |
|---|---|---|
| P1 | R1 | H1 |
| P2 | R2 | H1 |
| ⋮ | ⋮ | ⋮ |

FIG. 9

MAKEUP APPLICATION ASSISTANCE DEVICE, MAKEUP APPLICATION ASSISTANCE METHOD, AND MAKEUP APPLICATION ASSISTANCE PROGRAM

CROSS REFERENCE TO RELATED APPLICATIONS

This application is a continuation application of co-pending U.S. patent application Ser. No. 14/387,696, filed Sep. 24, 2014, which is a National Phase of PCT Application No. PCT/JP2014/000308 having International filing date of Jan. 22, 2014, which is claims priority of Japanese Patent Application No. 2013-18276, filed Feb. 1, 2013, the disclosures of which are expressly incorporated by reference herein.

TECHNICAL FIELD

The present invention relates to a makeup assisting apparatus, a makeup assisting method and a makeup assisting program for assisting facial makeup (cosmetic makeup).

BACKGROUND ART

In recent years, the way of making up the face (hereinafter, simply referred to as "makeup") has been diversified. It has become difficult, particularly for a person who has no sufficient knowledge about makeup to select appropriate makeup from countless numbers of options for makeup, because it takes an enormous amount of time and effort to actually try, judge and compare various types of makeup.

To address the above problem, for example, PTL 1 and PTL 2 disclose techniques in which makeup which suits for features of the face is selected, a simulation image of the face in a case where the selected makeup is applied is generated and presented. In the techniques described in PTL 1 and PTL 2 (hereinafter, referred to as "related art"), a captured image of the face to which makeup is to be applied (hereinafter, simply referred to as the "face") is acquired, the features of the face are extracted, and makeup which suits for the features of the face is selected based on a selection criterion determined in advance. Further, in the related art, the simulation image is generated by superimposing, on the acquired image, an image indicating a state of makeup when the selected makeup is applied to the face, and displayed.

With such related art, it is possible to judge whether or not makeup is good or bad by narrowing down a target for which the simulation image is to be generated to makeup which suits for the features of the face without actually applying makeup. That is, with the related art, it is possible to select appropriate makeup with less time and effort.

CITATION LIST

Patent Literature

PTL 1
Japanese Patent Application Laid-Open No. 2001-346627
PTL 2
Japanese Patent Application Laid-Open No. 2007-175384
PTL 3
Japanese Patent Application Laid-Open No. 2001-44837
PTL 4
Japanese Patent Application Laid-Open No. 2001-257165

SUMMARY OF INVENTION

Technical Problem

It is difficult for a user who has no sufficient skill in applying makeup to reproduce makeup even if a simulation image of makeup is presented, so that the user needs to improve her or his skill in applying makeup. Further, a person who studies makeup typically desires to improve skill in selecting makeup by judging the features of the face and judging appropriate makeup for herself or himself.

However, the above-described related art does not take into account assistance for improving makeup skills.

It is therefore an object of the present invention to provide a makeup assisting apparatus, a makeup assisting method and a makeup assisting program which can appropriately provide assistance for makeup including assistance for improving makeup skills.

Solution to Problem

A makeup assisting apparatus according to an aspect of the present invention includes: an image acquiring section that acquires a captured image of a face to which makeup is applied; an applied makeup acquiring section that acquires applied makeup from the image, the applied makeup being a way of applying the makeup; a makeup evaluating section that evaluates the applied makeup by comparing the applied makeup with reference makeup which is makeup to be used as a reference by a user having applied the makeup to the face; and an evaluation presenting section that presents a result of the evaluation to the user.

A makeup assisting method according to an aspect of the present invention includes: acquiring a captured image of a face to which makeup is applied; acquiring applied makeup from the image, the applied makeup being a way of applying the makeup; evaluating the applied makeup by comparing the applied makeup with reference makeup which is makeup to be used as a reference by a user having applied the makeup to the face; and presenting a result of the evaluation to the user.

A makeup assisting program according to an aspect of the present invention is a program causing a computer to execute processing including: acquiring a captured image of a face to which makeup is applied; acquiring applied makeup from the image, the applied makeup being a way of applying the makeup; evaluating the applied makeup by comparing the applied makeup with reference makeup which is makeup to be used as a reference by a user having applied the makeup to the face; and presenting a result of the evaluation to the user.

Advantageous Effects of Invention

According to the present invention, it is possible to appropriately provide assistance for makeup including assistance for improving makeup skills.

BRIEF DESCRIPTION OF DRAWINGS

FIG. 3 illustrates an example of reference makeup information in Embodiment 2;

FIG. 4 illustrates an example of cosmetics information in Embodiment 2;

FIG. 5 illustrates an example of a makeup position table in Embodiment 2;

FIG. 9 illustrates an example of facial part information in Embodiment 2;

DESCRIPTION OF EMBODIMENTS

Embodiments of the present invention will be described in detail below with reference to the accompanying drawings.

Embodiment 1

Embodiment 1 of the present invention is an example of a basic mode of the present invention.

Figure 1:
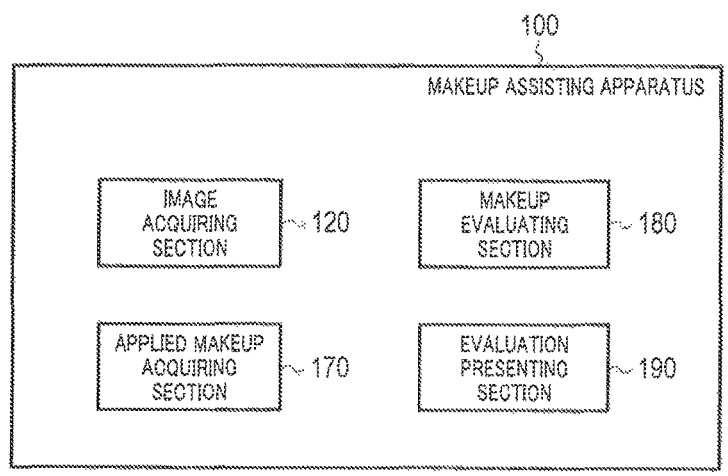
FIG. 1 is a block diagram illustrating an exemplary configuration of a makeup assisting apparatus according to Embodiment 1 of the present invention.

FIG. 1 is a block diagram illustrating an exemplary configuration of a makeup assisting apparatus according to the present embodiment.

In FIG. 1, makeup assisting apparatus 100 includes image acquiring section 120, applied makeup acquiring section 170, makeup evaluating section 180 and evaluation presenting section 190.

Image acquiring section 120 acquires a captured image of the face to which makeup has been applied.

Applied makeup acquiring section 170 acquires from the acquired image, applied makeup which is the way of applying the above-described makeup.

Makeup evaluating section 180 evaluates the applied makeup by comparing the applied makeup with reference makeup which should be used as a reference by a user who has applied the above-described makeup.

Evaluation presenting section 190 presents the evaluation result to the user.

Makeup assisting apparatus 100 has, for example, a central processing unit (CPU), a storage medium such as a read-only memory (ROM) having a control program stored therein, and a working memory such as a random access memory (RAM), which are not illustrated. In this case, the above-described functions of the sections are implemented by the CPU executing the control program.

Makeup assisting apparatus 100 configured as described above can evaluate the makeup applied by the user based on the reference makeup and can present the evaluation result to the user. By this means, makeup assisting apparatus 100 can present to the user objective evaluation of the makeup applied by the user, so that it is possible to appropriately provide assistance for makeup including assistance for improving makeup skills.

Embodiment 2

Embodiment 2 of the present invention is an example of a specific aspect of the present invention. The present embodiment describes an example where the present invention is applied to an apparatus provided with a digital camera and a display with a touch panel.

<Explanation of Terms>

First, terms used in the present embodiment will be described.

A "facial part" refers to a part characterizing impression of the face, such as eyes, eyebrows, nose, cheekbones, lips and an outline.

A "facial part ID" is identification information of the facial part.

An "area of the facial part" refers to an area occupied by the facial part on an image or in real space, and includes a position of a feature point of the facial part, such as corners of the eyes.

"Makeup" indicates the way (type) of applying makeup, and includes at least a color, application concentration and application range of a skin cosmetic agent.

"Reference makeup" is makeup which a user who will receive assistance for makeup should refer to.

"Reference makeup information" is information indicating reference makeup, and defines the reference makeup with a value of a predetermined parameter or a combination of values of a plurality of predetermined parameters.

"Applied makeup" is makeup which has been actually applied by the user who receives assistance for makeup.

"Applied makeup information" is information indicating the applied makeup, and defines the applied makeup with the same values of the parameters as those define the reference makeup information. That is, the values of the applied makeup information can be compared with the values of the reference makeup information for each parameter.

The "cosmetics information" is information regarding skin cosmetics for applying the makeup.

A "makeup type" is a type of makeup such as "foundation," "eye shadow," "lipstick" and "blush," which can be distinguished at least by positional relationship with the facial part.

A "cosmetics ID" is identification information of skin cosmetics, and can specify cosmetics information.

<Configuration of Makeup Assisting Apparatus>

Next, a configuration of the makeup assisting apparatus according to the present embodiment will be described.

Figure 2:
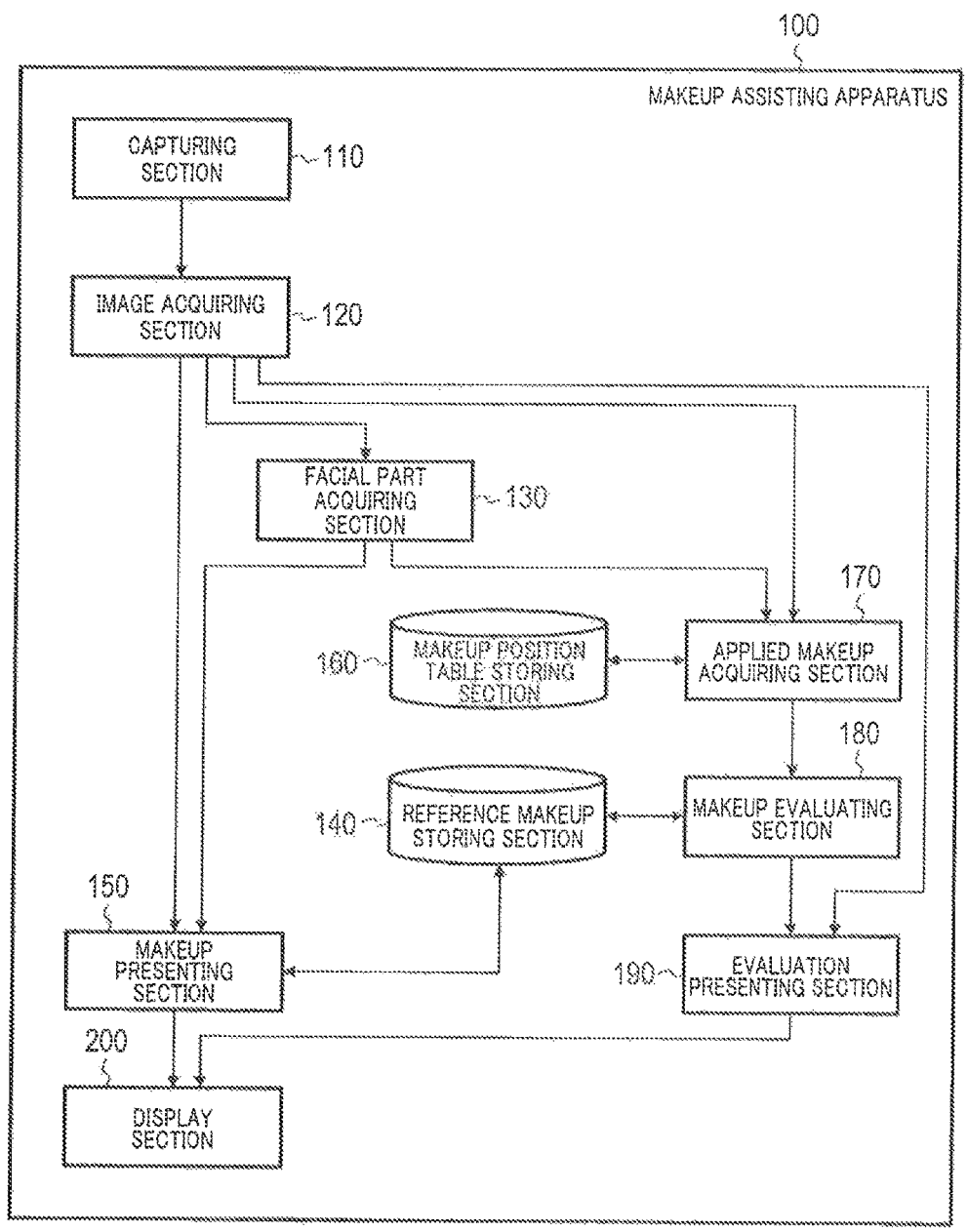
FIG. 2 is a block diagram illustrating an exemplary configuration of a makeup assisting apparatus according to Embodiment 2, of the present invention.

FIG. 2 is a block diagram illustrating an exemplary configuration of the makeup assisting apparatus according to the present embodiment.

In FIG. 2, makeup assisting apparatus 100 includes capturing section 110, image acquiring section 120, facial part acquiring section 130, reference makeup storing section 140, makeup presenting section 150, makeup position table storing section 160, applied makeup acquiring section 170, makeup evaluating section 180 evaluation presenting section 190 and display section 200.

Capturing section 110 is, for example, a digital still camera, and captures an image.

Image acquiring section 120 acquires a captured image of the face with no makeup on (hereinafter, referred to as the "face with no makeup on") (hereinafter referred to as a "no makeup image") using capturing section 110 and outputs the captured image to facial part acquiring section 130 and makeup presenting section 150. Further, image acquiring section 120 acquires a captured image of the face to which makeup has been applied to the above-described face (hereinafter, referred to as the "face with makeup on") (hereinafter, referred to as a "makeup image") using capturing section 110 and outputs the captured image to facial part acquiring section 130, applied makeup acquiring section 170 and evaluation presenting section 190.

Image acquiring section 120 captures a no makeup image by encouraging a user to capture an image of the face with no makeup on, for example, by displaying a message of "capture an image of the face to which makeup is to be applied, with no makeup on" on a display. Further, image acquiring section 120 captures a makeup image by encouraging the user to capture an image of the face with makeup on, for example, by displaying a message of "capture an image of the face with makeup on" on the display. It is noted in the present embodiment that the no makeup image and the makeup image are images of the face captured from the front.

Facial part acquiring section 130 acquires an area of the facial part of the face from each of the input no makeup image and makeup image. The area of the facial part is acquired, for example, through matching between each partial area of the image and a template image of each facial part prepared in advance (for example, see PTL 3). Facial part acquiring section 130 outputs identification information of the facial part and information indicating the area acquired from the image of the face with no makeup on (hereinafter, referred to as "no makeup facial part information") to makeup presenting section 150. Further, facial part acquiring section 130 outputs identification information of the facial part and information indicating the area acquired from the image of the face with makeup on (hereinafter, referred to as "makeup facial part information") to applied makeup acquiring section 170.

Reference makeup storing section 140 stores in advance reference makeup information and cosmetics information of the reference makeup indicated by the reference makeup information. The reference makeup information can be referred to from makeup presenting section 150 and makeup evaluating section 180. The cosmetics information can be referred to from makeup presenting section 150.

It should be noted that there are a countless number of patterns of makeup (hereinafter, referred to as "makeup patterns") to be applied to the whole face. It is assumed in the present embodiment that only the reference makeup information of one makeup pattern selected in advance is stored in reference makeup storing section 140.

The makeup pattern indicated by the reference makeup information may include, for example, the following makeup patterns.

The first one is a makeup pattern selected by the user. The second one is a makeup pattern selected from a plurality of types of makeup based on a selection criterion set so as to preferentially select a makeup pattern with a larger number of times the makeup pattern has been selected among a plurality of makeup patterns which have been selected as makeup to be applied in makeup by a plurality of persons. The third one is a makeup pattern selected from a plurality of types of makeup based on a selection criterion set so as to preferentially select a makeup pattern with a latest average time at which the makeup pattern has been selected among a plurality of makeup patterns which have been selected as makeup to be applied in makeup by a plurality of persons. The fourth one is a makeup pattern selected from a plurality of types of makeup based on a selection criterion set so as to preferentially select a makeup pattern with a higher rate of increase in the number of times the makeup pattern has been selected among a plurality of makeup patterns which have been selected as makeup to be applied in makeup by a plurality of persons.

Makeup in fashion is often makeup which has been actually applied by a larger number of people. Therefore, in a case of the second to the fourth makeup patterns, the reference makeup is makeup in fashion, and makeup assisting apparatus 100 can evaluate makeup on the basis of the makeup in fashion.

FIG. 3 illustrates an example of reference makeup information stored in reference makeup storing section 140.

As illustrated in FIG. 3 reference makeup information 510 describes, for example, makeup ID 511, makeup type 512, color 513, concentration 514, range 515 and cosmetics ID 516 in association with one another.

Makeup type 512, which is illustrated in a simplified manner in FIG. 3, specifically includes "foundation," "eye shadow," "lipstick," "blush," and the like. Color 513, which is illustrated in a simplified manner in FIG. 3, specifically includes an RGB value, a gloss level, and the like. Concentration 514, which is illustrated in a simplified manner in FIG. 3, specifically includes a level of permeability, a way of gradation, and the like when an image is superimposed on an image of the face. Range 515, which is illustrated in a simplified manner in FIG. 3, specifically includes a relative coordinate group from a feature point, a set of a relative position of a central point with respect to a feature point and a radius, and the like. That is, a set of color 513, concentration 514 and range 515 includes at least information required for forming an image. In other words, in the present embodiment, reference makeup information 510 includes at least information required for generating an image in a case where makeup is applied to the face from the image of the face.

It should be noted that reference makeup information 510 may further describe an application pattern of skin cosmetics. The application pattern of skin cosmetics is, for example, information indicating a relative range with respect to the facial part, such as eye holes, eye lines, portions below the eyes, or the like in the case of eye shadow.

FIG. 4 illustrates an example of cosmetics information stored in reference makeup storing section 140.

As illustrated in FIG. 4, cosmetics information 520 describes cosmetics ID 521, company ID 522 and item number 523 in association with one another.

Cosmetics ID 521 corresponds to cosmetics ID 516 in reference makeup information 510. Company ID 522 is a name or an identifier of the company which manufactures or sells the skin cosmetics. Item number 523 is an item number of the skin cosmetics.

It should be noted that reference makeup information 510 and cosmetics information 520 illustrated in FIG. 3 and FIG. 4 may be integrated into one table.

Makeup presenting section 150 in FIG. 2 presents to the user makeup indicated in the reference makeup information in association with the corresponding area of the facial part of the face with no makeup on.

More specifically, makeup presenting section 150 generates a simulation image based on the input no makeup image and reference makeup information and outputs the generated simulation image to display section 200. Here, the simulation image is an image obtained by superimposing an image in a case where makeup of reference makeup indicated in the reference makeup information is applied on the input (captured) no makeup image.

It should be noted that the image is superimposed by, for example, publicly-known image synthesis process such as alpha ($\alpha$) blending process. In this case, an alpha value ($\alpha$)

is set according to concentration of makeup. The alpha blending process is expressed with, for example, the following Equations 1 to 3:

[1]

$$R = r_2 \times \alpha + r_1 \times (1-\alpha) \quad \text{(Equation 1)}$$

[2]

$$G = g_2 \times \alpha + g_1 \times (1-\alpha) \quad \text{(Equation 2)}$$

[3]

$$B = b_2 \times \alpha + b_1 \times (1-\alpha) \quad \text{(Equation 3)}$$

where $r_1$, $g_1$ and $b_1$ are RGB values of an arbitrary area in the captured image, $r_2$, $g_2$ and $b_2$ are RUB values of makeup, and R, G and B are RGB values of the corresponding area in the simulation image.

Further, it is assumed that an order of application when makeup is applied to the face in an overlapped manner (hereinafter, referred to as an "application order") is set for each makeup, and an image in a case where the makeup is applied is presented as an image shaded with density according to the concentration. The application order defines, for example, blush should be applied after foundation is applied. In this case, the images may be superimposed on the captured image by overpainting the image of each makeup in an order according to the application order.

Further, makeup presenting section 150 further presents the cosmetics information. More specifically, makeup presenting section 150 superimposes or adds an image or text indicating the cosmetics information on or to the above-described simulation image.

Makeup position table storing section 160 stores in advance a makeup position table which defines positional relationship with an area of the facial part of an application range of makeup for each makeup type. This positional relationship is, in other words, a criterion for extracting applied makeup when applied makeup acquiring section 170 extracts applied makeup from the image of the face with makeup on which will be described later. The makeup position table can be referred to from applied makeup acquiring section 170.

FIG. 5 illustrates an example of the makeup position table.

As illustrated in FIG. 5, makeup position table 530 describes makeup type 533 in association with a combination of facial part ID 531 and area 532.

For example, makeup type 533 of "T2" is associated with a combination of facial part ID 531 of "P2" and area 532 of "R2." This indicates that makeup of makeup type 533 of "T2" is applied to area 532 of "R2" which corresponds to an area of facial part it) 531 of "P2."

it is assumed, for example, that "P2" indicates the right eye, and "R2" indicates an area which is adjacent to an upper end of an area of the facial part and which has a width of 1% or lower of the length of the face and which is continuous with the same color other than skin color. It is assumed that "T2" which corresponds to these indicates eye liner. In this case, if there is an area which is adjacent to the upper end of the area of the right eye and which has a width of 1% or lower of the length of the face and which is continuous with the same color other than skin color, the area indicates an area for eye liner.

Applied makeup acquiring section 170 of FIG. 2 acquires applied makeup applied to the face with makeup on based on the area of the facial part indicated in the makeup facial part information for each facial part from the image of the face with makeup on.

More specifically, applied makeup acquiring section 170 detects whether or not there is an area to which makeup has been applied for each facial part based on an extraction criterion defined in makeup position table 530 (see FIG. 5). When there is an area to which makeup has been applied, applied makeup acquiring section 170 acquires the area as an application range of makeup. Further, applied makeup acquiring section 170 acquires color and application concentration of the makeup applied to the area from the image of the face with makeup on. Applied makeup acquiring section 170 outputs the acquired applied makeup information indicating the applied makeup to makeup evaluating section 180. Acquisition of makeup will be described in detail later.

Makeup evaluating section 180 performs evaluation of the applied makeup (hereinafter, referred to as "makeup evaluation") by comparing the input applied makeup with reference makeup stored in reference makeup storing section 140.

More specifically, makeup evaluating section 180 performs makeup evaluation by obtaining an evaluation value indicating a degree of approximation between the applied makeup and the reference makeup based on a difference in a value for each of the above-described parameters between the applied makeup and the reference makeup. Makeup evaluating section 180 then outputs the obtained evaluation value to evaluation presenting section 190. Makeup evaluation will be described in detail later.

Evaluation presenting section 190 presents the evaluation value which is a result of the makeup evaluation to the user.

More specifically, evaluation presenting section 190 generates an evaluation result image indicating the evaluation result based on the input makeup image and evaluation value and outputs the generated evaluation result image to display section 200. Here, the evaluation result image is an image including the input (captured) makeup image and information indicating the evaluation result including the evaluation value (hereinafter, referred to as "evaluation result information").

Display section 200 which is, for example, a display, displays (presents) the input simulation image and cosmetics information to the user of makeup assisting apparatus 100. Further, display section 200 displays (presents) the input evaluation result image to the user of makeup assisting apparatus 100.

It should be noted that makeup assisting apparatus 100 includes, for example, a CPU, a storage medium such as a ROM having a control program stored therein, and a working memory such as a RAM, which are not illustrated. In this case, functions of the above-described sections are realized by the CPU executing the control program.

<Acquisition of Makeup>

A method for acquiring makeup from an image includes, for example, the following method.

Applied makeup acquiring section 170 first specifies an area having color close to color of the skin of the face with makeup on, such as ears and neck, from the position of the area of the facial part. Applied makeup acquiring section 170 estimates color distribution of the skin based on color of the specified area, distribution of shade estimated from the position of the facial part, distribution of color for each facial part estimated from the type of the facial part (such as lips), and the like. Applied makeup acquiring section 170 calculates a difference between the estimated color of the skin and actual color in the image for each of divided areas obtained by minutely dividing the facial area. Applied makeup acquiring section 170 then determines that a divided area which the calculated difference is a predetermined threshold or greater as an area to which makeup has been applied (hereinafter, referred to as an "applied divided area").

If there are a plurality of applied divided areas which are continuous and which have approximate color among the determined applied divided areas, applied makeup acquiring section 170 extracts the plurality of applied divided areas as one area to which makeup of the same type has been applied (hereinafter, referred to as a "continuous applied area"). Applied makeup acquiring section 170 determines whether or not the area matches any of extraction criteria defined by makeup position table 530 (see FIG. 5) for each of the extracted continuous applied areas. Applied makeup acquiring section 170 acquires a continuous applied area which matches the extraction criterion as an application range of makeup and acquires color and application concentration of makeup from color of the area in the image and the color of the skin estimated for the corresponding area.

The color and application concentration of makeup is acquired by, for example, performing reverse process of the above-described alpha blending process. That is, the above-described RGB value is set as color of the image, $r_1$, $g_1$ and $b_1$ are set as color of the skin, and $r_2$, $g_2$ and $b_2$ corresponding to color of makeup and α corresponding to concentration of makeup are calculated using Equations 1 to 3. However, because there are three equations for four variables, it is necessary to presume any one of these four variables or perform operation for a plurality of image positions to obtain a set of most probable values.

<Makeup Evaluation>

A makeup evaluation method includes, for example, the following method.

Makeup evaluating section 180 calculates a sum of the squares of a difference in a value of each parameter between the reference makeup information and the applied makeup information for the above-described plurality of parameters after perforating weighting according to types of the parameters.

That is, makeup evaluating section 180 calculates partial error (distance) v for each type of makeup using the following Equations 4 to 6:

[4]

$$v_0 = \{(r_1-r)^2 + (g_r-g)^2 + (b_r-b)^2\} \cdot w_1 + \{(x_{1r}-x_1)^2 + (y_{1r}-y_1)^2 \ldots + (x_{nr}-x_n)^2 + (y_{nr}-y_n)^2\} \cdot w_2 + \{(d_1-d)^2\} \cdot w_3 \quad \text{(Equation 4)}$$

[5]

$$v_r = (r_r^2 + g_r^2 + b_r^2) \cdot w_1 + (x_{1r}^2 + y_{1r}^2 \ldots + x_{nr}^2 + y_{nr}^2) \cdot w_2 + d_r^2 \cdot w_3 \quad \text{(Equation 5)}$$

[6]

$$v = v_0/v_r \quad \text{(Equation 6)}$$

Here, $r_r$, $g_r$ and $b_r$ are RGB values of the reference makeup and r, g and b are RGB values of the applied makeup. These RGB values are, for example, the average of color in the application range of makeup.

Further, $x_{1r}$, $y_{1r}$, ... $x_{nr}$ and $y_{nr}$ are a group of coordinate values indicating the application range of the reference makeup, and $x_1$, $y_1$, ... $x_n$ and $y_n$ are a group of coordinate values indicating the application range of the applied makeup. These groups of coordinate values are, for example, values in the coordinate system set for each makeup type based on the features point of the facial part, and orientation and size of the area of the facial part. The number of coordinate values n may be different for each makeup type.

Further, $d_r$ is application concentration of the reference makeup, while d is application concentration of the applied makeup. These application concentrations are, for example, the averages of the application concentrations in the application ranges of makeup.

Further, weights $w_1$, $w_2$ and $w_3$ are values respectively determined according to how much a difference in color, a difference in an application range and a difference in application concentration should affect the evaluation value. For example, if importance should be placed on the difference in color, a larger value is set for the value of weight $w_1$. Weights $w_1$, $w_2$ and $w_3$ may be different for each makeup type.

Makeup evaluating section 180 calculates total error V from partial error v calculated for each makeup type as a value indicating a level of an error (distance) of the applied makeup with respect to the reference makeup for the whole face using, for example. Equation 7 below. Here, a case will be described where the reference makeup includes makeup of three makeup types of eye shadow, blush and lipstick. Meanwhile, $v_{eye}$ is a partial error of eye shadow, $v_{check}$ is a partial error of blush, and $v_{lip}$ is a partial error of lipstick.

[7]

$$V = v_{eye} + v_{check} + v_{lip} \quad \text{(Equation 7)}$$

It should be noted that makeup evaluating section 180 may also apply to each partial error v, the weight determined according to how much a difference in makeup of the corresponding makeup type should affect the evaluation value.

Makeup evaluating section 180 acquires an evaluation value corresponding to total error V comparing calculated total error V with, for example, five thresholds determined in advance in association with evaluation values of six levels. The evaluation values of six levels are, for example, 100 points, 80 points, 60 points, 40 points, 20 points and 0 point, in descending order of approximation of the applied makeup to the reference makeup.

It should be noted that makeup evaluating section 180 may prepare a plurality of patterns of the above-described thresholds in accordance with a level of a person who applies makeup (a target). By this means, makeup assisting apparatus 100 can present an evaluation value which is suitable for the level of the target, and thus can adjust a level of difficulty when the person gets a higher score.

Makeup assisting apparatus 100 having the above-described configuration can evaluate makeup applied by the user based on the reference makeup and present the evaluation result to the user.

<Operation of Makeup Assisting Apparatus>

Next, operation of makeup assisting apparatus 100 will be described.

Figure 6:
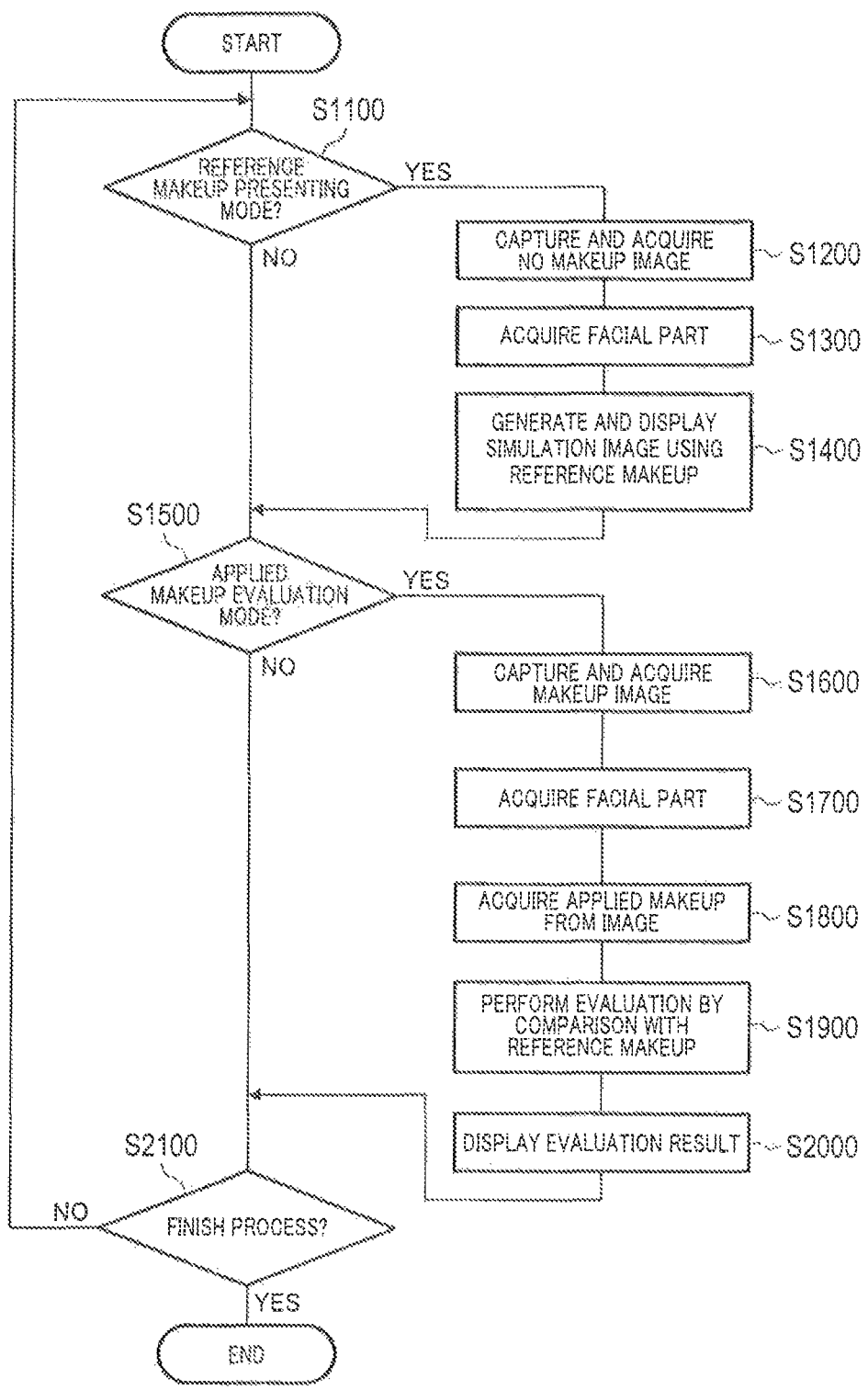
FIG. 6 is a flowchart illustrating exemplary operation of the makeup assisting apparatus according to Embodiment 2.

FIG. 6 is a flowchart illustrating exemplary operation of makeup assisting apparatus 100.

Makeup assisting apparatus 100, for example, sequentially receives instructions to start operation in a reference makeup presentation mode or in an applied makeup evaluation mode from the user through a display with a touch panel. The reference makeup presentation mode is a mode in which a simulation image of the reference makeup for the face with no makeup on is displayed. The applied makeup evaluation mode is a mode in which the image of the face with makeup on is evaluated based on the reference makeup and the evaluation result is displayed.

For example, the user, first, confirms the simulation image of the reference makeup in the reference makeup presentation mode, and, then, executes makeup with reference to the reference makeup and designates the applied makeup evaluation mode.

First, in step S1100, image acquiring section 120 judges whether or not start of the reference makeup mode is instructed through user operation, or the like.

If start of the reference makeup mode is instructed (S1100: Yes), the flow proceeds to step S1200. Meanwhile, if start of the reference makeup mode is not instructed (S1100: No), the flow proceeds to step S1500 which will be described later.

In step S1200, image acquiring section 120 captures an image of the face with no makeup on at capturing section 110 and acquires a no makeup image.

Figure 7:
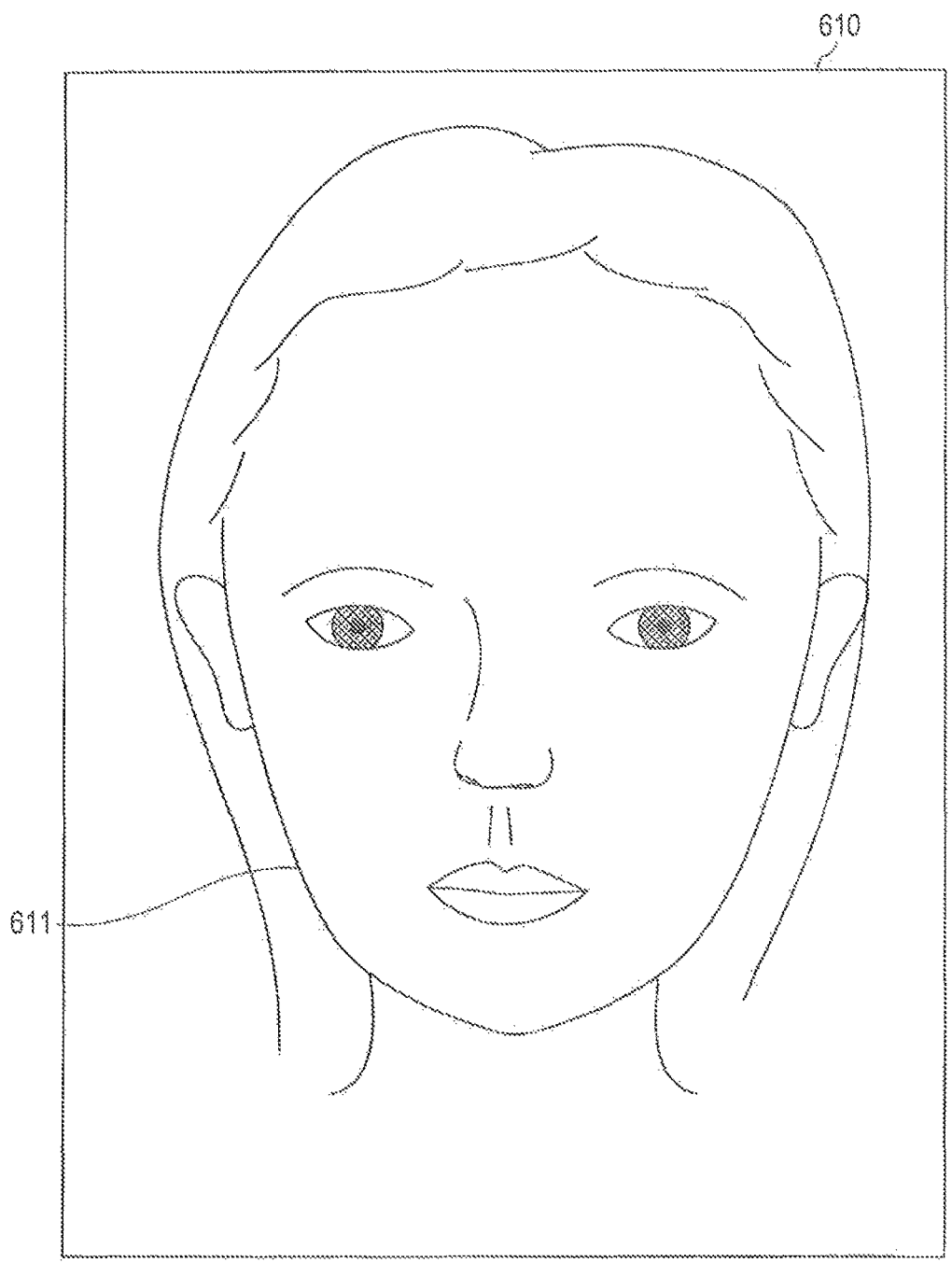
FIG. 7 illustrates an example of a no makeup image in Embodiment 2.

FIG. 7 illustrates an example of the no makeup image acquired in step S1100 of FIG. 6.

As illustrated in FIG. 7, no makeup image 610 includes image of the face with no makeup on (hereinafter, referred to as a "no makeup face image") 611.

In step S1300 of FIG. 6, facial part acquiring section 130 acquires the facial part of the face with no makeup on from no makeup image 610. At this time, facial part acquiring section 130 extracts feature points (of the facial part) of the face from no makeup image 610 by, for example, analyzing no makeup image 610. Facial part acquiring section 130 acquires an area formed with the feature points constituting the same facial part as an area of the facial part. Facial part acquiring section 130 generates no makeup facial part information from the acquired area of the facial part.

Figure 8:
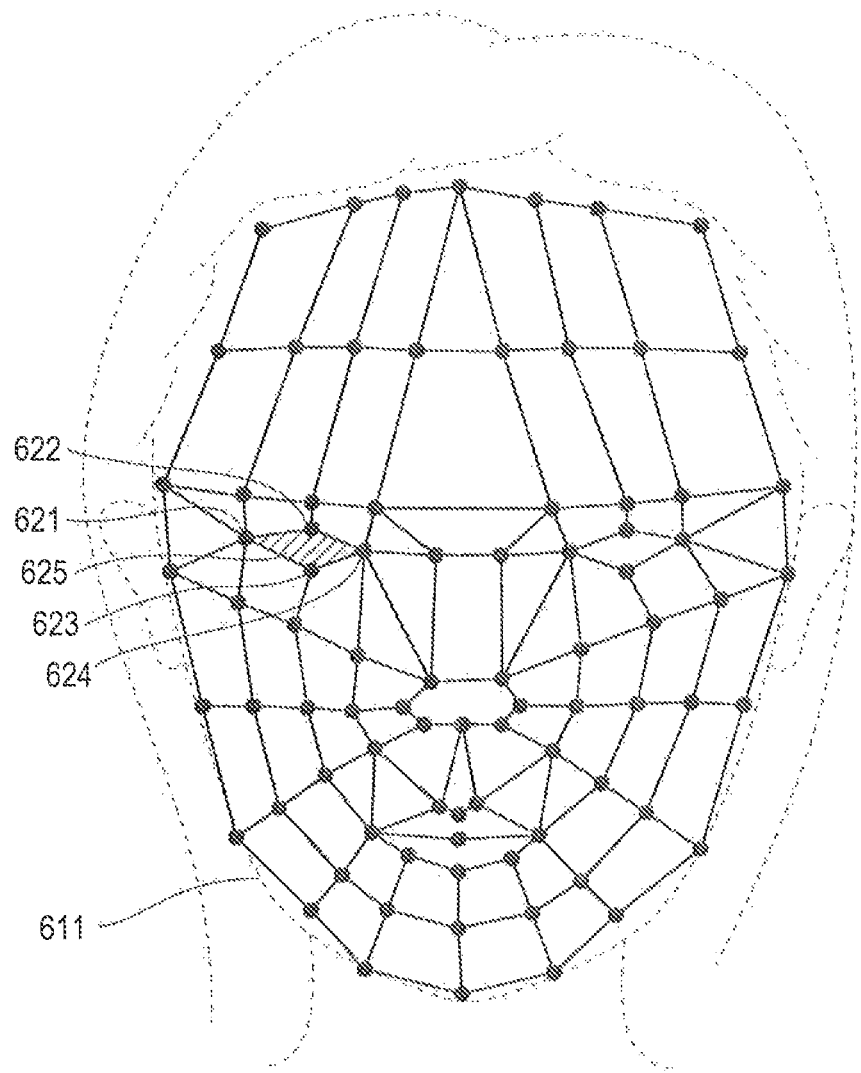
FIG. 8 illustrates an example of placement of feature points of the face in Embodiment 2.

FIG. 8 illustrates an example of placement of feature points of the face, extracted in step S1300 of FIG. 6.

As illustrated in FIG. 8, a plurality of feature points (expressed with a symbol "●") are extracted from no makeup face image 611. For example, first to fourth feature points 621 to 624 constitute the right eye. Therefore, facial part acquiring section 130 acquires area 625 enclosed by first to fourth feature points 621 to 624 as an area of the right eye.

FIG. 9 illustrates an example of the no makeup facial part information generated in step S1300 of FIG. 6.

As illustrated in FIG. 9, no makeup facial part information 630 describes, for example, area 632 and person ID 633 for each facial part ID 631. Area 632, which is information indicating a range of the area of the facial part in the image, is a list of coordinate values of a coordinate system set on the image, for example. As person ID 633, for example, a value designated by the user through operation to a display with touch panel or the like is set every time capturing is started.

In step S1400 of FIG. 6, makeup presenting section 150 generates a simulation image based on the no makeup image and the reference makeup information and makes display section 200 display the simulation image. At this time, makeup presenting section 150 makes display section 200 also display the cosmetics information.

Figure 10:
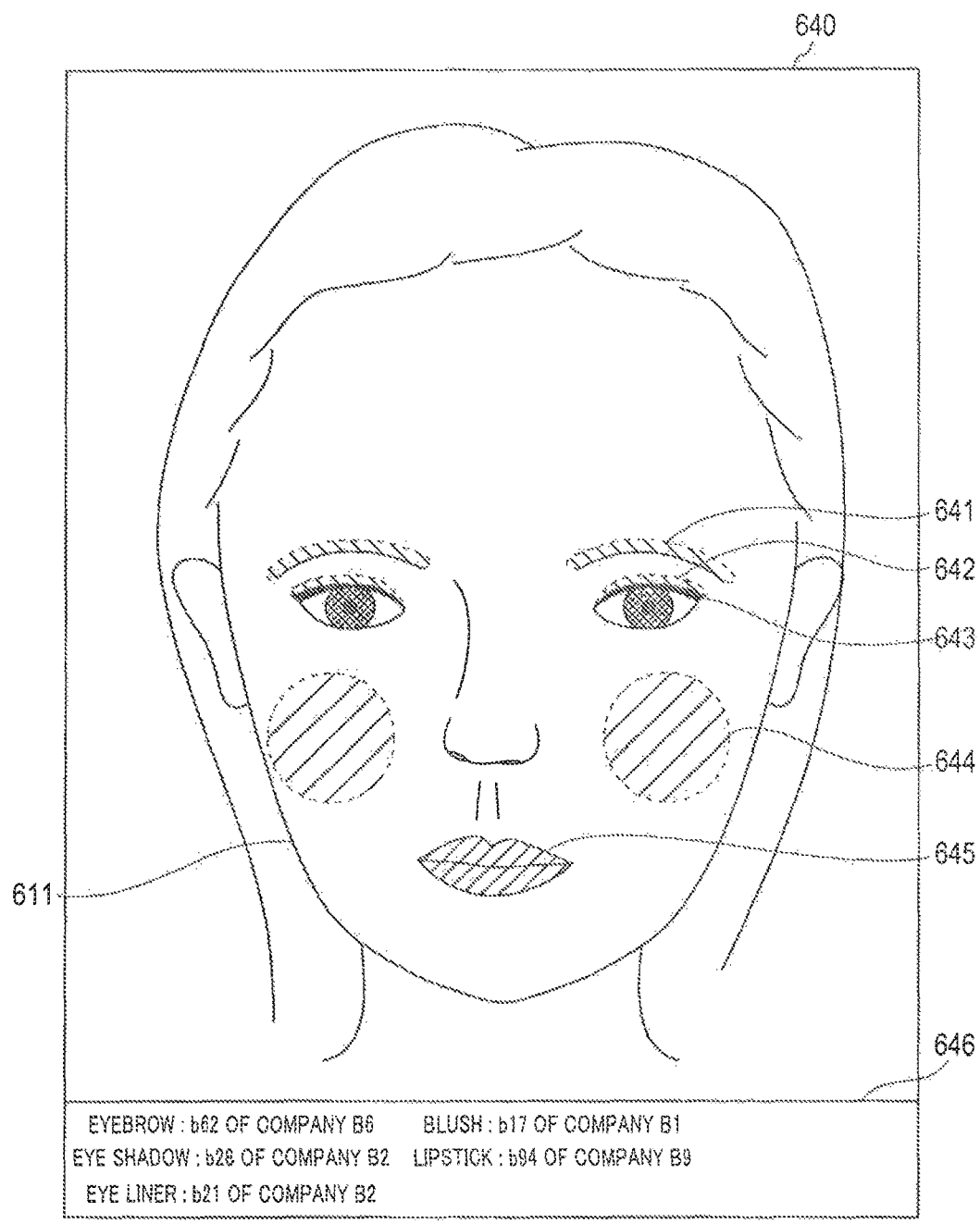
FIG. 10 illustrates an example of a simulation image in Embodiment 2.

FIG. 10 illustrates an example of the simulation image displayed in step S1400 of FIG. 6.

As illustrated in FIG. 10, simulation image 640 is an image obtained by superimposing images 641 to 645 of makeup for the face such as eye blow, eye shadow, eye liner, blush and lipstick on no makeup face image 611.

Further, information display area 646 which indicates the cosmetics information is added to simulation image 640. That is, in simulation image 640, cosmetics information of skin cosmetics required for applying makeup indicated in the reference makeup information is also displayed. If the user likes makeup shown in the displayed simulation image 640, the user can get required skin cosmetics based on the displayed cosmetics information and can easily put on her makeup actually.

In step S1500, image acquiring section 120 judges whether or not start of the applied makeup evaluation mode is instructed through user operation, or the like.

If start of the applied makeup evaluation mode is instructed (S1500: Yes), the flow proceeds to step S1600. Meanwhile, if start of the applied makeup evaluation mode is not instructed (S1500: No), the flow proceeds to step S2100, which will be described later.

In step S1600, image acquiring section 120 captures an image of the face with makeup on at capturing section 110 and acquires a makeup image.

Figure 11:
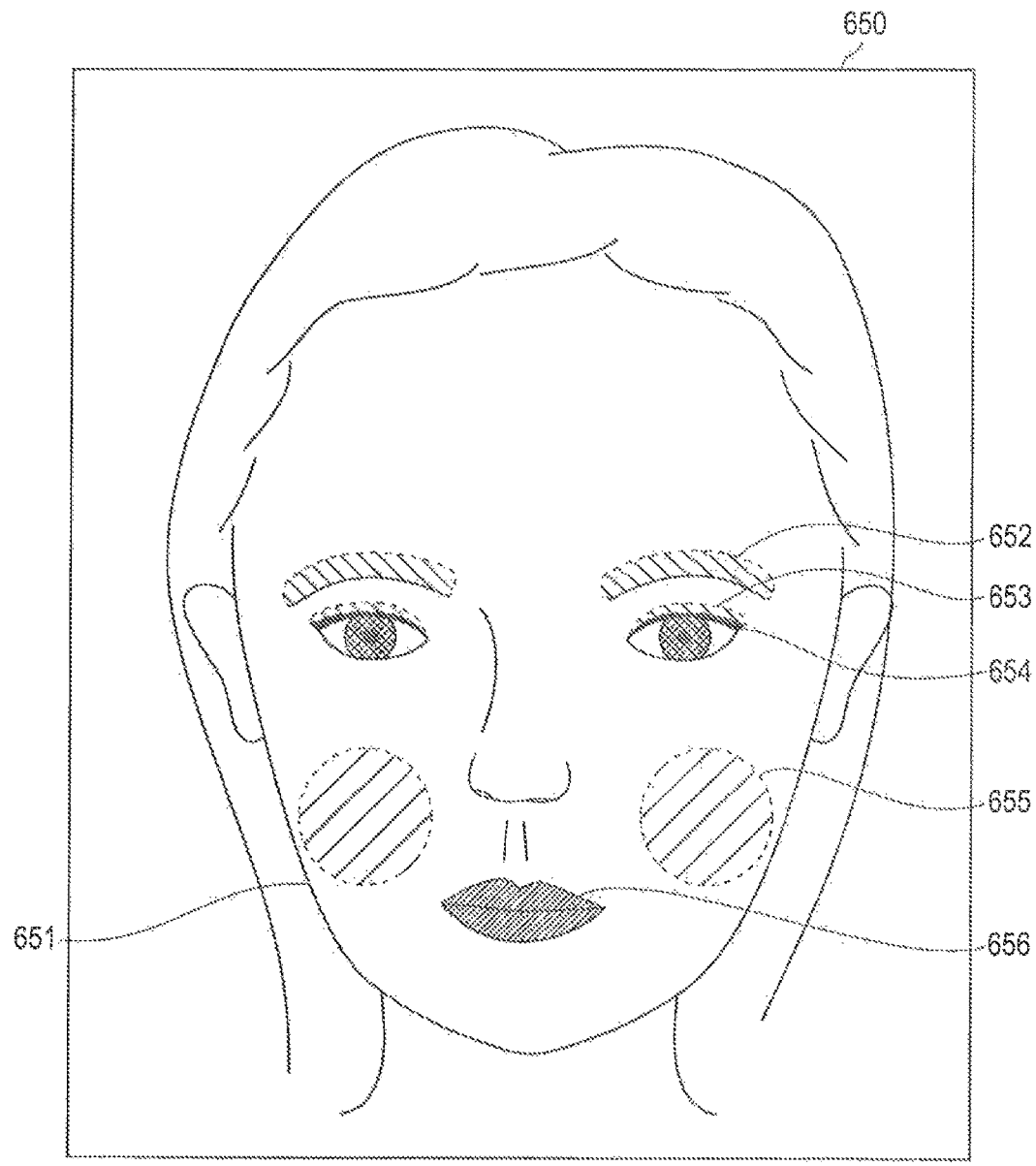
FIG. 11 illustrates an example of a makeup image in Embodiment 2.

FIG. 11 illustrates an example of the makeup image acquired in step S1600 of FIG. 6.

As illustrated in FIG. 11, for example, applied makeup 652 to 656 in the image of the face with makeup on (hereinafter, referred to as a "makeup face image") 651 included in makeup image 650 is different from reference makeup indicated in simulation image 640 of FIG. 10. For example, eye blow 652 is larger in width than eye blow image 641 of the reference makeup, blush 655 is positioned lower than blush image 644 of the reference makeup, and lipstick 656 is darker than lipstick image 645 of the reference makeup.

In step S1700 of FIG. 6, facial part acquiring section 130 acquires the facial part (including the features points of the face) of the face with makeup cm from makeup image 650 and acquires the area of the facial part. Facial part acquiring section 130 generates makeup facial part information from the acquired area of the facial part. These processes are the same as the processes described in step S1300. Further, the configuration of the makeup facial part information is the same as the configuration of the no makeup facial part information.

In step S1800, applied makeup acquiring section 170 acquires applied makeup from the makeup image. Specifically, applied makeup acquiring section 170 acquires makeup for each facial part from the makeup image and the makeup facial part information with reference to makeup position table 530 (see FIG. 5) stored in makeup position table storing section 160. Applied makeup acquiring section 170 outputs the applied makeup information indicating the acquired makeup to makeup evaluating section 180.

Figure 12:
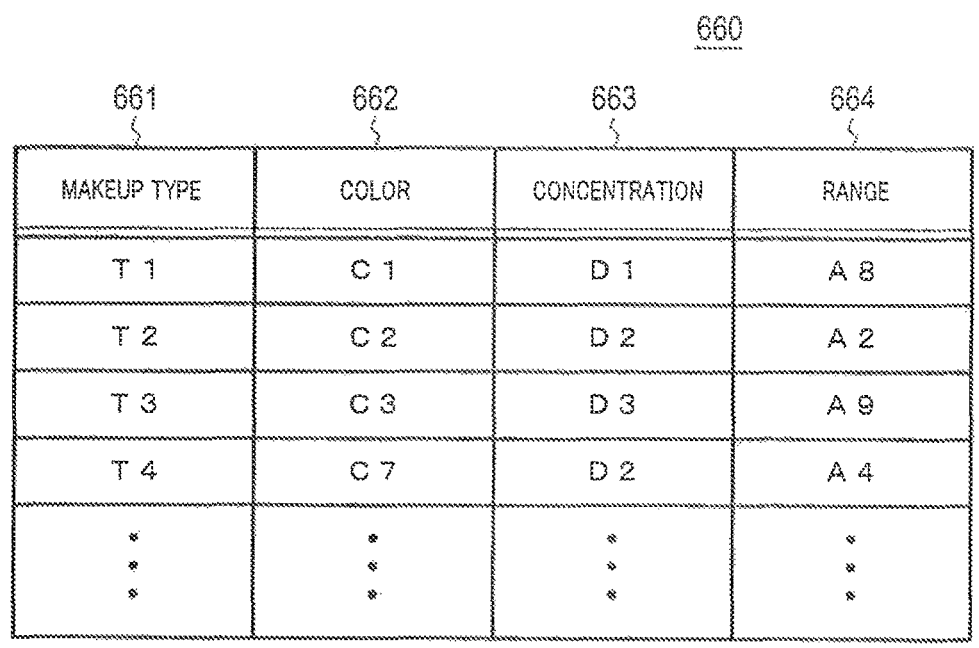
FIG. 12 illustrates an example of applied makeup information in Embodiment 2.

FIG. 12 illustrates an example of the applied makeup information output in step S1800 of FIG. 6.

As illustrated in FIG. 12, applied makeup information 660 describes color 662, concentration 663 and range 664, for example, in association with makeup type 661. Makeup type 661 corresponds to makeup type 512 of reference makeup information 510 (sec FIG. 3). Further, color 662, concentration 663 and range 664, which are illustrated in a simplified manner in FIG. 12, are, specifically, defined by the same parameter as that of reference makeup information 510 (see FIG. 3) for each makeup type 661.

For example, range 664 corresponding to makeup type 661 of "T1" in applied makeup information 660 is "A8." Range 664 of "A8" is different from range 515 of "A1" corresponding to makeup type 512 of "T1" in reference makeup information 510. This indicates that, for example, a relative application range of eye blow with respect to the area of the left eye is different between the reference makeup and the applied makeup.

In step S1900 of FIG. 6, makeup evaluating section 180 evaluates the applied makeup by comparing the applied makeup information with the reference makeup information. Specifically, makeup evaluating section 180 determines an evaluation value using, for example, the above-described Equations 4 to 7 and outputs evaluation result information to evaluation presenting section 190.

In step S2000, evaluation presenting section 190 generates an evaluation result image based on the evaluation result information and the makeup image and makes display section 200 display the evaluation result image.

Figure 13:
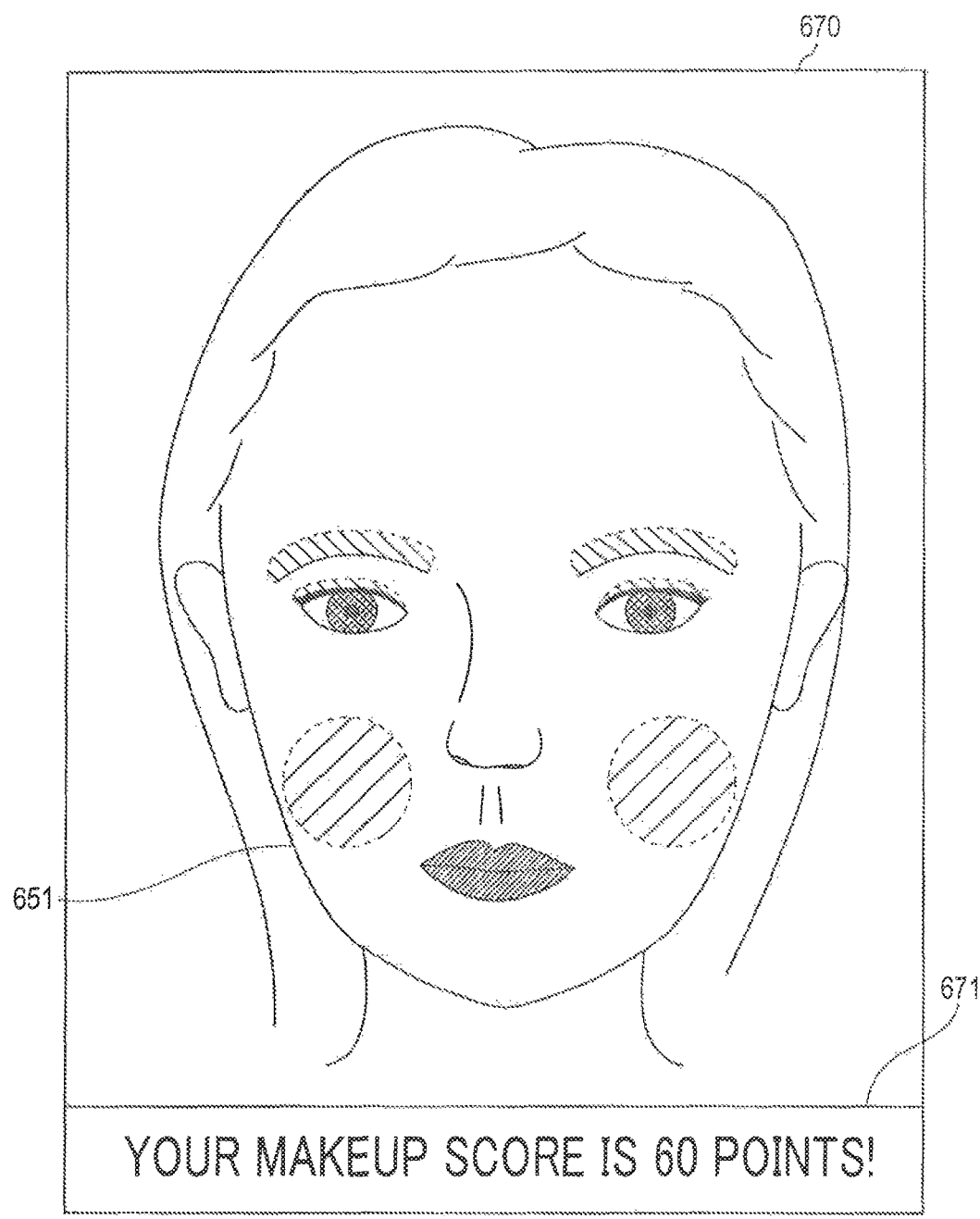
FIG. 13 illustrates an example of an evaluation result image in Embodiment 2.

FIG. 13 illustrates an example of the evaluation result image displayed in step S2000 of FIG. 6.

As illustrated in FIG. 13, evaluation result image 670 includes makeup face image 651 and result display area 671 indicating the evaluation result information. In result display area 671, for example, text of "your makeup score is 60 points!" which includes the above-described evaluation value is displayed.

In step S2100, image acquiring section 120 judges whether or not it is instructed to finish the process through user operation, or the like.

If it is not instructed to finish the process (S2100: No), the flow returns to step S1100. Meanwhile, if it is instructed to finish the process (S2100: Yes), a series of processes is finished.

With the operation as described above, makeup assisting apparatus 100 can present the simulation image of the reference makeup to the user during the reference makeup presenting mode, while presenting to the user the evaluation of makeup which has been actually applied by the user during the applied makeup evaluation mode.

<Effect of the Present Embodiment>

As described above, makeup assisting apparatus 100 according to the present embodiment can evaluate the applied makeup applied by the user based on the reference makeup and present the evaluation result to the user. By this means, makeup assisting apparatus 100 can present to the user, objective evaluation to the makeup applied by the user, so that it is possible to appropriately provide assistance for makeup including assistance for improving makeup skills.

<Another Makeup Acquiring Method>

It should be noted that the applied makeup acquiring method is not limited to the above-described example. For example, applied makeup acquiring section 170 may acquire an image captured by an apparatus other than makeup assisting apparatus 100 as a no makeup image or a makeup image. In this case, for example, it is only necessary to provide a communication circuit for connecting to a public network such as Internet at makeup assisting apparatus 100, and image acquiring section 120 only has to acquire a required image through the communication circuit.

Further, applied makeup acquiring section 170 may acquire information of color among makeup from sources other than actual color in the makeup image. For example, applied makeup acquiring section 170 may receive the input of a cosmetics ID of cosmetics used for makeup from the user through the display with the touch panel and acquire information of color corresponding to the received cosmetics ID from a table prepared in advance.

Further, applied makeup acquiring section 170 may acquire the applied makeup based on a difference between the image of the face with no makeup on and the image of the face with makeup on.

<Mapping of Facial Image and Makeup>

Further, while in the present embodiment, both the no makeup image and the makeup image are images of the face captured from the front, the images are not limited to this. For example, if image acquiring section 120 acquires an image of the face captured from an oblique direction, image acquiring section 120 may map the facial image to a stereoscopic shape of the face by employing a publicly known image mapping technique, and may generate an image of the face seen from the front. It should be noted that the stereoscopic shape of the face used for mapping may be a standard stereoscopic shape of the face or a stereoscopic shape acquired from a stereo image based on the stereo image or the like.

Further, makeup assisting apparatus 100 may display an image of the face captured from a direction other than the front. For example, facial part acquiring section 130 associates a two-dimensional coordinate system in the image with a three-dimensional coordinate system in the stereoscopic shape of the face based on the feature points of the face, and makeup presenting section 150 and applied makeup acquiring section 170 create an image of the reference makeup or acquire the applied makeup based on the above-described association.

Further, makeup assisting apparatus 100 may acquire a three-dimensional difference obtained by adding a difference in the a axis as a difference of an application range between the reference makeup and the applied makeup and use the difference in makeup evaluation.

<Removal of Makeup>

While a case has been assumed in the present embodiment where a captured image of the face with no makeup on is input in the reference makeup presenting mode, the present invention is not limited to this. For example if the image of the face input during the reference makeup presenting mode is an image of the face with makeup on, image acquiring section 120 may generate a no makeup image from the makeup image using a publicly known image processing technique (see for example, PTL 4).

<Selection of Reference Makeup>

While a case has been assumed in the present embodiment where only the reference makeup information of one makeup pattern selected in advance is stored in reference makeup storing section 140, the present invention is not limited to this.

For example, makeup information indicating each makeup pattern may be prepared for a plurality of makeup patterns, and makeup presenting section 150 or makeup evaluating section 180 may determine one makeup pattern as reference makeup based on a predetermined selection condition. The predetermined selection condition may include, for example, a condition that a makeup pattern conforms to the above-described selection criterion.

Further, for example, if a plurality of makeup patterns are associated with a facial feature value group, it is possible to employ, as the above-described selection condition, a condition that a makeup pattern corresponding to a group which is the closest in distance to the facial feature value with no makeup on or the face with makeup on is selected. Here, the facial feature value is a value of a predetermined parameter indicating the features of the face, and is, for example, multivariate data including a plurality of values such as a ratio of the length of the face with respect to the width of the face, a ratio of the length of the nose with respect to an interval between the both eyes and a ratio of the width of the eye with respect to the width of the face.

The facial feature value is grouped, for example, as described below. First, principal component analysis is performed on samples of the facial feature value of an unspecified number of faces to which makeup has been applied. Then, a result of the principal component analysis is grouped using a publicly known principal component grouping method in which it is judged based on a determination criterion such as whether or not a principal component value is 1σ or higher.

Further, for example, a plurality of makeup patterns may be associated with a region, classification of a makeup pattern (such as mature makeup and pretty makeup), age and other information. In this case, makeup assisting apparatus 100 may acquire the information by, for example, receiving input from the user through the display with the touch panel or the like and determine the makeup pattern as the reference makeup by narrowing down the corresponding makeup pattern.

<Other Information to be Presented>

Further, makeup assisting apparatus 100 may generate and display a simulation image of the face for which makeup has been halfway finished instead of the simulation image of the face for which all the makeup has been applied during the reference makeup presenting mode. Further, if an application order is set for each makeup as described above, makeup assisting apparatus 100 may sequentially generate and display simulation images of the face for which makeup has been halfway finished according to the application order. Accordingly, makeup assisting apparatus 100 can present to the user an appropriate order of the makeup.

Further, makeup assisting apparatus 100 may present association with the area of the reference makeup and color and concentration of the reference makeup using text. This text is, for example, "apply blush of item number b55 of company B1 thickly to ranges with a diameter of about 4 cm centering around the highest points of the both cheekbones," or the like. Some users can imagine the face to which makeup of the reference makeup has been applied only from the text information. It is possible to sufficiently assist such users to apply makeup even with such a presenting method.

Further, makeup assisting apparatus 100 may perform makeup evaluation and present the makeup evaluation for each makeup type or for each of other attributes such as color, application concentration and an application range. Makeup assisting apparatus 100 may highlight a portion with a high evaluation score or a portion with a low evaluation score among the makeup in the evaluation result image.

Further, makeup assisting apparatus 100 may present advice information indicating how to correct the makeup so as to make it close to the reference makeup. For example, makeup assisting apparatus 100 displays a message that "eyebrow is too thick. Color of lipstick is too dark."

Further, makeup assisting apparatus 100 may present the evaluation result and the advice information superimposed on the makeup image. In this case, it is desirable that each information be presented using an arrow or the like to associate the information with a makeup type which is a target of evaluation or advice.

Further, makeup assisting apparatus 100 does not necessarily have to acquire the applied makeup for each makeup type. For example, makeup assisting apparatus 100 may perform evaluation only for shades of color of the whole face and present the evaluation result. Such evaluation is suitable for, for example, evaluation of the whole color tone (such as cool color and warm color) of makeup or evaluation of makeup assuming a case where only foundation is to be applied.

<Variations with Other Configurations>

Further, a person to which the reference makeup information is to be presented does not necessarily have to be a person of the face for which the simulation image has been generated.

Further, the reference makeup information, the cosmetics information and the makeup position table do not necessarily have to be stored in makeup assisting apparatus 100. For example, if makeup assisting apparatus 100 is connectable to a network, makeup assisting apparatus 100 only has to access a server which stores the above-described information on the network to acquire the reference makeup information, the cosmetics information and the applied makeup.

Further, makeup assisting apparatus 100 may be a distributed arrangement system, for example, a system in which, among functional sections illustrated in FIG. 2, only capturing section 110 and display section 200 are disposed at a terminal of the user and the other sections of the apparatus are disposed on a server on the network, or the like.

Further, applied makeup acquiring section 170 may detect outside light and acquire makeup in a state where influence of the outside light is reduced from the image.

Still further, the specific items of makeup are not limited to the above-described examples. For example, makeup for the face to be evaluated includes mascara, lip gloss, and the like.

A makeup assisting apparatus according to this disclosure includes: an image acquiring section that acquires a captured image of a face to which makeup is applied; an applied makeup acquiring section that acquires applied makeup from the image, the applied makeup being a way of applying the makeup; a makeup evaluating section that evaluates the applied makeup by comparing the applied makeup with reference makeup which is makeup to be used as a reference by a user having applied the makeup to the face; and an evaluation presenting section that presents a result of the evaluation to the user.

In the makeup assisting apparatus: the applied makeup and the reference makeup are each defined by a value of one predetermined parameter or a combination of values of a plurality of predetermined parameters; and the makeup evaluating section may perform the evaluation based on a difference between the respective values of the predetermined parameters of the applied makeup and the reference makeup.

In the makeup assisting apparatus: the makeup evaluating section may calculate an evaluation value indicating a degree of approximation between the applied makeup and the reference makeup based on the difference between the values; and the evaluation presenting section may present the evaluation value to the user.

The makeup assisting apparatus further includes: a reference makeup storing section that stores, for each facial part, the reference makeup corresponding to the facial part; and a facial part acquiring section that acquires an area of the facial part of the face from the image, in which: the applied makeup acquiring section may acquire, for each facial part, the applied makeup based on the area of the facial part; and the makeup evaluating section may compare the applied makeup with the reference makeup for each facial part.

In the makeup assisting apparatus, the applied makeup and the reference makeup include at least a color, application concentration and application range of a skin cosmetic agent, and the makeup assisting apparatus may further include a makeup presenting section that presents, to the user, the reference makeup in association with a corresponding area of the facial part.

A makeup assisting method according to this disclosure includes: acquiring a captured image of a face to which makeup is applied; acquiring applied makeup from the image, the applied makeup being a way of applying the makeup; evaluating the applied makeup by comparing the applied makeup with reference makeup which is makeup to be used as a reference by a user having applied the makeup to the face, and presenting a result of the evaluation to the user.

A makeup assisting program according to this disclosure is a program causing a computer to execute processing including: acquiring a captured image of a face to which makeup is applied; acquiring applied makeup from the image, the applied makeup being a way of applying the makeup; evaluating the applied makeup by comparing the applied makeup with reference makeup which is makeup to be used as a reference by a user having applied the makeup to the face and presenting a result of the evaluation to the user.

The disclosure of the specification, drawings, and abstract in Japanese Patent Application No. 2013-018276 filed on Feb. 1, 2013 is incorporated herein by reference in its entirety.

INDUSTRIAL APPLICABILITY

The present invention is useful as a makeup assisting apparatus, a makeup assisting method and a makeup assisting program which can appropriately provide assistance for makeup including assistance for improving makeup skills.

REFERENCE SIGNS LIST

100 Makeup assisting apparatus
110 Capturing section
120 Image acquiring section
130 Facial part acquiring section
140 Reference makeup storing section
150 Makeup presenting section
160 Makeup position table storing section
170 Applied makeup acquiring section
180 Makeup evaluating section
190 Evaluation presenting section
200 Display section

What is claimed is:

1. A makeup assisting apparatus including a processor that executes instructions and a memory that stores the instructions and configured to:
acquire a captured image of a face and, when the captured image of the face is captured from an oblique direction, to map the captured image of the face to a stereoscopic shape of the face to generate a first image of the face seen from a first direction that is different from the oblique direction;
acquire applied makeup from the first image, the applied makeup being makeup that has been actually applied on the face and a way of applying makeup;
perform an evaluation of the applied makeup by comparing the applied makeup with a reference makeup, which is to be used as a reference by a user having the applied makeup to the face; and
present a result of the evaluation to the user.

2. The makeup assisting apparatus according to claim 1, further configured to display a two-dimensional coordinate system in the captured image of the face in association with a three-dimensional coordinate system in the stereoscopic shape of the face, based on feature points of the face, to display and generate a second image of the face captured from a direction other than the first direction.

3. A makeup assisting method comprising:
acquiring a captured image of a face;
mapping, when the captured image of the face is captured from an oblique direction, the captured image of the face to a stereoscopic shape of the face to generate a first image of the face seen from a first direction that is different from the oblique direction;
acquiring applied makeup from the first image, the applied makeup being makeup that has been actually applied on the face and a way of applying makeup;
evaluating the applied makeup by comparing the applied makeup with a reference makeup which is to be used as a reference by a user having the applied the makeup to the face; and
presenting a result of the evaluation to the user.

4. The makeup assisting method according to claim 3, further comprising:
associating a two-dimensional coordinate system in the captured image of the face with a three-dimensional coordinate system in the stereoscopic shape of the face, based on feature points of the face, to generate a second image of the face captured from a direction other than the first direction; and
displaying the second image generated at the associating.

5. The makeup assisting apparatus according to claim 1, wherein the first direction is a direction viewing the face from a front of the face.

6. The makeup assisting method according to claim 3, wherein the first direction is a direction viewing the face from a front of the face.

7. The makeup assisting apparatus according to claim 1, the reference makeup comprising a reference makeup pattern selected by the user or based on frequency of use.

8. The makeup assisting method according to claim 3, the reference makeup comprising a reference makeup pattern selected by the user or based on frequency of use.

9. The makeup assisting apparatus according to claim 1, the reference makeup comprising reference makeup information, the reference makeup information including makeup ID, makeup type, makeup color, makeup concentration, makeup range and cosmetics ID associated with one another.

10. The makeup assisting method according to claim 3, the reference makeup comprising reference makeup information, the reference makeup information including makeup ID, makeup type, makeup color, makeup concentration, makeup range and cosmetic ID associated with one another.

11. The makeup assisting apparatus according to claim 1, wherein the applied makeup acquired from the first image is determined based upon a difference between an estimated skin color and an actual color in the first image, for each of a plurality of divided areas that are obtained by dividing an area of the first image of the face.

12. The makeup assisting method according to claim 3, wherein acquiring the applied makeup from the first image comprises determining a difference between an estimated skin color and an actual color in the first image, for each of a plurality of divided areas that are obtained by dividing an area of the first image of the face.

13. The makeup assisting apparatus according to claim 1, wherein the result of the evaluation presented to the user includes a display of an evaluation result image including a makeup face image together with evaluation result information.

14. The makeup assisting method according to claim 3, wherein the presenting a result of the evaluation includes displaying an evaluation result image including a makeup face image together with evaluation result information.

15. The makeup assisting apparatus according to claim 1, wherein the makeup assisting apparatus is further configured to:
   virtually apply a makeup image of a makeup product over a corresponding portion of a facial image to combine a color corresponding to the makeup product with an underlying color of the facial image to generate the reference image.

16. The makeup assisting apparatus according to claim 1, wherein the applied makeup is identified and extracted from the first image based on a color difference at different portions of the first image.

* * * * *